United States Patent
Chung et al.

(10) Patent No.: US 8,248,531 B2
(45) Date of Patent: Aug. 21, 2012

(54) DIGITAL PHOTO FRAME WITH TELEVISION TUNING FUNCTION AND METHOD THEREOF

(75) Inventors: Shin-Hong Chung, Taipei Hsien (TW); Li-Hua Hu, Shenzhen (CN); Chia-Yu Cheng, Taipei Hsien (TW); Zai-An Pan, Shenzhen (CN); Han-Che Wang, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 801 days.

(21) Appl. No.: 12/416,133

(22) Filed: Mar. 31, 2009

(65) Prior Publication Data

US 2010/0033637 A1    Feb. 11, 2010

(30) Foreign Application Priority Data

Aug. 11, 2008   (CN) .......................... 2008 1 0303646

(51) Int. Cl.
*H04N 5/50* (2006.01)
*H04N 5/46* (2006.01)
*H04N 5/44* (2006.01)

(52) U.S. Cl. ........ 348/553; 348/554; 348/555; 348/731; 348/725; 348/705; 725/38

(58) Field of Classification Search .................. 348/552, 348/705, 553, 554, 555, 731, 725, 729; 725/38, 725/133, 134, 141
See application file for complete search history.

(56) References Cited

U.S. PATENT DOCUMENTS 7,352,407 B2 *   4/2008   Lan et al. ...................... 348/569
7,647,529 B2 *   1/2010   An ................................ 714/43

FOREIGN PATENT DOCUMENTS

| CN | 1373421 A | 10/2002 |
|---|---|---|
| CN | 1489379 A | 4/2004 |
| CN | 1832545 A | 12/2010 |
| TW | M328056 | 3/2008 |
| TW | 200818912 A | 4/2008 |

* cited by examiner

*Primary Examiner* — Jefferey Harold
*Assistant Examiner* — Jean W Desir
(74) *Attorney, Agent, or Firm* — Altis Law Group, Inc.

(57) ABSTRACT

A method with television (TV) tuning function applied on a digital photo frame (DPF) is provided. The method includes: fetching a prompt time of at least one particular TV program; determining whether a prompt time of a particular TV program is about to arrive or has already arrived at the current time; fetching a prompt signal of the particular TV program whose prompt time is about to arrive or has already arrived, and outputting the prompt signal to prompt a particular TV program is being aired or about to air; switching the DPF from the DPF mode to a TV mode and providing the channel parameter of the particular TV program upon receiving a mode switching signal during the outputting of the prompt signal; and; and receiving and playing the particular TV program according to the channel parameter. A related DPF is also provided.

9 Claims, 3 Drawing Sheets

DIGITAL PHOTO FRAME WITH TELEVISION TUNING FUNCTION AND METHOD THEREOF

BACKGROUND

1. Technical Field

The present disclosure relates to a digital photo frame (DPF) with television (TV) tuning function and method thereof.

2. Description of Related Art

Along with the rapid development in electronic technology, DPFs have become familiar to consumers. Some types of DPFs have been designed to not only play photos, but also receive television (TV) programs.

People get their TV program schedule information mainly from entertainment sections in newspapers or from electronic program guides (EPGs). However, people may forget the schedule and miss the TV programs they want to see. At present, some types of DPFs are capable of receiving TV programs. However, these types of DPFs cannot prompt users to watch their TV programs when their TV programs are airing or about to air.

BRIEF DESCRIPTION OF THE DRAWINGS

The components of the drawings are not necessarily drawn to scale, the emphasis instead being placed upon clearly illustrating the principles of a digital photo frame (DPF) with television (TV) tuning function and method thereof. Moreover, in the drawings, like reference numerals designate corresponding parts throughout several views.

DETAILED DESCRIPTION

Figure 1:
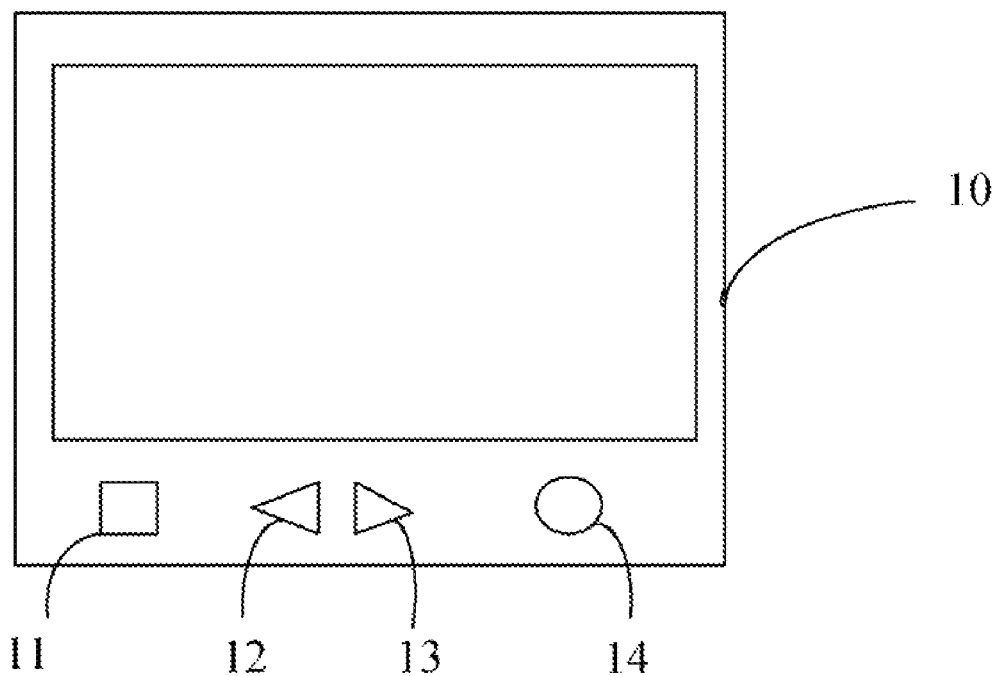
FIG. 1 is a front view of a DPF with television (TV) tuning function in accordance with an exemplary embodiment.

FIG. 1 is a front view of a digital photo frame (DPF) 10 with television (TV) tuning function in accordance with an exemplary embodiment.

The DPF 10 mainly includes a power button 11, a previous button 12, a next button 13, and a switch button 14. The power button 11 is configured for powering on and powering off the DPF 10. The switch button 14 is configured for manually switching an operation mode of the DPF 10, for example, between a DPF mode and a TV mode. When the DPF 10 is in the DPF mode, the previous button 12 and the next button 13 are configured for paging through multimedia files such as photos stored in the DPF 10. When the DPF 10 is in the TV mode, the previous button 12 and the next button 13 are configured for changing TV channels.

Figure 2:
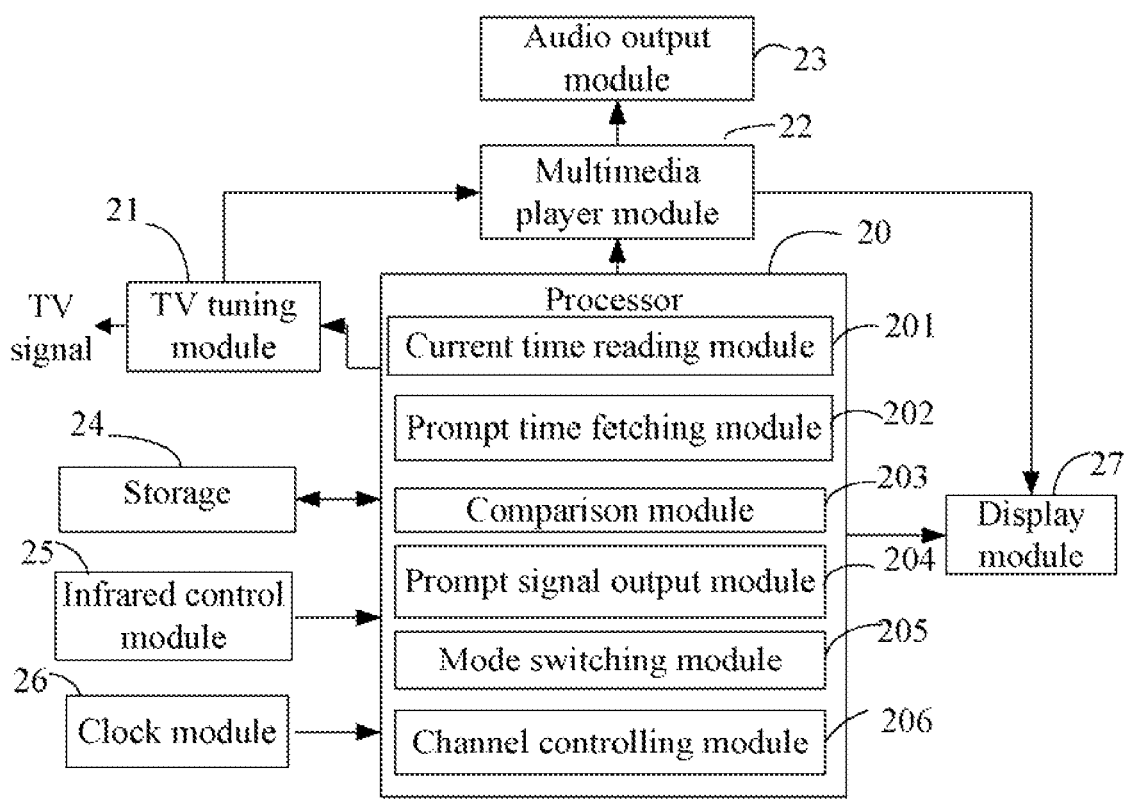
FIG. 2 is a block diagram of the DPF of FIG. 1 in accordance with an exemplary embodiment.

FIG. 2 is a block diagram of the DPF 10 in accordance with an exemplary embodiment.

The DPF 10 includes a processor 20, and further includes a TV tuning module 21, a multimedia player module 22, a storage 24 and a display module 27, which are all connected to and controlled by the processor 20.

The storage 24 is configured for storing multimedia files. The multimedia files may include photos, audio files, video files, and so on. When the DPF 10 is in the DPF mode, the processor 20 fetches the multimedia files from the storage 24 and transfers the multimedia files to the multimedia player module 22. The multimedia player module 22 then reproduces image/video data of the multimedia files on the display module 27. When the DPF 10 is in the TV mode, the TV tuning module 21 is controlled by the processor 20 to receive TV signals and transfers the TV signals to the multimedia player module 22. The TV tuning module 21 may receive TV signals by any usual means such as via an antenna (not shown) or a cable (not shown). The multimedia player module 22 then reproduces image/video data of the TV signals on the display module 27. The multimedia player module 22 is connected to an audio output module 23 (e.g., a speaker) and the display module 26. The audio output module 23 is configured to output audio data of the multimedia files and the TV signals.

The DPF 10 may also include an infrared control module 25. The infrared control module 25 is configured for receiving infrared control signals from a remote control (not shown) and converts the infrared control signals to digital serial signals. The digital serial signals are sent to the processor 20 and the processor 20 adjusts various parameters of the controllable modules according to the digital serial signals. The previous button 13 and the next button 14 can also be integrated onto the remote control to control the play of the multimedia files and TV programs.

The DPF 10 also provides a user interface (UI) (not shown) on the display module 27. The UI is configured for users to set a prompt time, a prompt signal, and a channel parameter of each of particular TV programs in which users are interested in, for example, those favored by users. The prompt signal can be outputted as a text message and/or an audible alert, to notify the users a particular TV program is being aired or about to air. The channel parameter can be a channel number or a channel frequency. The prompt time, prompt signal, and channel parameter of each of the particular TV programs are received and stored in the storage 24 by the processor 20.

The DPF 10 further includes a clock module 26 configured for providing current time.

The processor 20 includes a current time reading module 201, a prompt time fetching module 202, a comparison module 203, a prompt signal output module 204, a mode switching module 205, and a channel controlling module 206.

The current time reading module 201 is configured for reading the current time from the clock module 26.

The prompt time fetching module 202 is configured for fetching prompt times of the particular TV programs from the storage 24.

The comparison module 203 is configured for determining whether one or more prompt times are about to arrive or have already arrived at the current time. If the comparison module 203 determines a prompt time falls ahead of the current time but within a preset time interval, the prompt time is classified as "about to arrive". If the comparison module 203 determines a prompt time falls behind the current time but within the preset time interval, or, if the comparison module 203 determines a prompt time is at the current time, the prompt time is classified as "already arrived".

The prompt signal output module 204 is configured to fetch a prompt signal of the particular TV program whose prompt time is defined as "about to arrive" or "already arrived", and output the fetched prompt signal via the multimedia player module 22 for a preset time interval, to notify users a particular TV program is being aired or about to air.

The mode switching module 205 is configured for changing operation modes of the DPF 10 between the DPF mode and the TV mode when a mode switching signal transmitted from the switch button 14 is received. Generally, according to an exemplary embodiment, if a mode switching signal is received, the mode switching module 205 switches the DPF 10 from the DPF mode to the TV mode, and further provides the channel parameter of the particular TV program whose prompt signal is outputting to the channel controlling module 206. The channel controlling module 206 is configured for controlling the TV tuning module 21 to receive the particular TV program according to the channel parameter.

Figure 3:
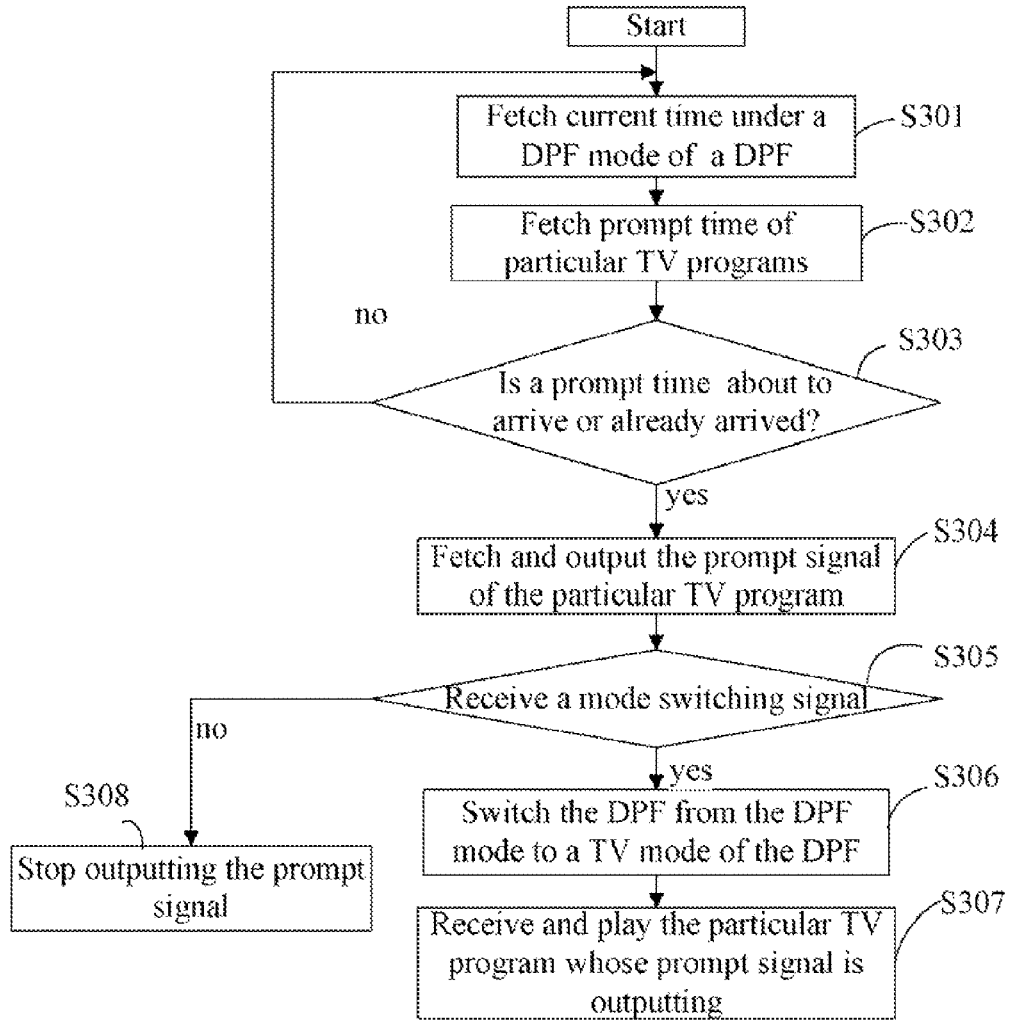
FIG. 3 is a flowchart for illustrating the DPF of FIG. 1 outputting TV program prompt signal in accordance with an exemplary embodiment.

FIG. 3 is a flowchart for illustrating the DPF 10 outputting TV program prompt signal in accordance with an exemplary embodiment.

In step S301, in the DPF mode, the current time reading module 201 fetches the current time from the clock module 26.

In step S302, the prompt time fetching module 202 fetches the prompt times of the particular TV programs from the storage 24.

In step S303, the comparison module 203 determines whether one prompt time is about to arrive or has already arrived. If yes, the procedure forwards to step S304, if no, the procedure will go to execute step S201 every regular time interval.

In step S304, the prompt signal output module 204 fetches a prompt signal of the particular TV program whose prompt time is about to arrive or has already arrived and outputs the prompt signal via the multimedia player module 22 for a preset time interval, as a text message and/or an audible alert to notify the users a particular TV program is aired or airing soon.

In step S305, the mode switching module 205 determines whether a mode switching signal is received within the output of the prompt signal. If yes, the flow of process forwards to step S306, if no, the procedure forwards to step S308.

In step S306, the mode switching module 205 switches the DPF 10 from the DPF mode to the TV mode, and provides the channel parameter of the particular TV program to the channel controlling module 206.

In step S307, the channel controlling module 206 controls the TV tuning module 21 to receive the particular TV program according to the channel parameter.

In step S308, the prompt signal output module 204 stops outputting the prompt signal via the multimedia player module 22.

Generally, the DPF 10 executes the method at the regular time interval. In the exemplary embodiment, if the comparison module 203 determines a plurality of prompt times are about to arrive or have already arrived, the comparison module 203 further determines a prompt sequence of the particular TV programs according to the time sequence of the plurality of prompt times. The prompt time ahead of all the other prompt times is defined as the first prompt time. During the whole procedure, the prompt signal output module 204 fetches and outputs the prompt signals of the particular TV programs whose prompt time are defined as "about to arrive" or "already arrived" one after another according to the prompt sequence, notifying the users of the particular TV programs which are being aired or about to air. Within the output of a prompt signal of a particular TV program, the particular TV program can be selected to play if the switch button 14 is operated and a mode switching signal is produced and transmitted to the mode switching module 205.

Although the present disclosure has been specifically described on the basis of preferred embodiments and method thereof, the disclosure is not to be construed as being limited thereto. Various changes or modifications may be made to the embodiments without departing from the scope and spirit of the invention.

What is claimed is:

1. A digital photo frame (DPF) with television (TV) tuning function comprising a DPF mode and a TV mode, comprising:
    a TV tuning module configured for receiving TV programs;
    a storage configured for storing a prompt time, a prompt signal and a channel parameter of at least one particular TV program;
    a clock module configured for providing current time; and
    a processor comprising:
        a current time reading module configured for fetching current time from the clock module;
        a prompt time fetching module configured for fetching the prompt time of the at least one particular TV program from the storage;
        a comparison module configured for determining whether a prompt time of a particular TV program among the at least one particular TV program is about to arrive or has already arrived at the current time;
        a prompt signal output module configured for fetching a prompt signal of a particular TV program whose prompt time is about to arrive or has already arrived, and outputting the prompt signal via the multimedia player module within a preset time interval;
        a mode switching module configured for switching the DPF from the DPF mode to the TV mode upon receiving the mode switching signal transmitted from input during the outputting of the prompt signal, and further configured for providing the channel parameter of the particular TV program to a channel controlling module; and
        a channel controlling module configured for controlling the TV tuning module to receive the particular TV program according to the channel parameter.

2. The DPF as described in claim 1, wherein if the comparison module determines a prompt time of a particular TV program falls ahead of the current time but within a preset time interval, the prompt time is classified as the "about to arrive", and if the comparison module determines a prompt time of a particular TV program falls behind the current time but within a preset time interval, or if the comparison module determines a prompt time of a particular TV program is at the current time, the prompt time is classified as "already arrived".

3. The DPF as described in claim 1, wherein the comparison module is further configured for determining the prompt sequence of the prompt times according to the time sequence if the comparison module determines that a plurality of prompt times are about to arrive or have already arrived.

4. The DPF as described in claim 3, wherein the prompt time ahead of all the other prompt times is defined as the first prompt time according to the prompt sequence, and the prompt signal of the particular TV program whose prompt time is the first prompt time is output firstly.

5. The DPF as described in claim 1, further comprising an infrared control module, connected to the processor, to interact with an external remote controller to provide various parameters for the processor to control controllable modules.

6. A method of a digital photo frame (DPF) with television (TV) tuning function comprising a DPF mode and a TV mode, the method comprising:
    fetching a prompt time of at least one particular TV program;
    determining whether the prompt time of the particular TV program among the at least one particular TV program is about to arrive or has already arrived at current time;

fetching a prompt signal of the particular TV program whose prompt time is about to arrive or has already arrived, and outputting the prompt signal within a preset time interval;

switching the DPF from the DPF mode to a TV mode and providing a channel parameter of the particular TV program upon receiving a mode switching signal within the output of the prompt signal; and receiving and playing the particular TV program according to the channel parameter.

7. The method as described in claim 6, wherein determining whether a prompt time is about to arrive or has already arrived at the current time further comprises classifying the prompt time as "about to arrive" if the prompt time falls ahead of the current time but within a predetermined time interval, and classifying a prompt time as "already arrived" if the prompt time of a particular TV program falls behind the current time but within a predetermined time interval, or the prompt time is at the current time.

8. The method as described in claim 7, further comprising:

determining the prompt sequence of the prompt times according to the time sequence if a plurality of the prompt time are about to arrive or have already arrived.

9. The method as described in claim 8, wherein the prompt time ahead of all the other prompt time is defined as the first prompt time according to the prompt sequence, and the prompt signal of the particular TV program whose prompt time is the first prompt time is output firstly.

* * * * *